(12) United States Patent
Hilbert et al.

(10) Patent No.: US 9,213,160 B2
(45) Date of Patent: Dec. 15, 2015

(54) ADJUSTABLE TROUGH-COUPLERS

(71) Applicant: Telect Inc., Liberty Lake, WA (US)

(72) Inventors: Greg Hilbert, Liberty Lake, WA (US); Steven W Ellison, Mead, WA (US)

(73) Assignee: Telect, Inc., Liberty Lake, WA (US)

( * ) Notice: Subject to any disclaimer, the term of this patent is extended or adjusted under 35 U.S.C. 154(b) by 116 days.

(21) Appl. No.: 13/842,734

(22) Filed: Mar. 15, 2013

(65) Prior Publication Data

US 2014/0263868 A1 Sep. 18, 2014

(51) Int. Cl.
*F16L 3/08* (2006.01)
*G02B 6/44* (2006.01)

(52) U.S. Cl.
CPC ......... *G02B 6/4459* (2013.01); *Y10T 29/49947* (2015.01); *Y10T 403/3906* (2015.01)

(58) Field of Classification Search
CPC ........ F16L 13/24; H02G 3/0437; H02G 3/32; H02G 3/36; H02G 3/38; H02G 7/053
USPC ............ 248/65, 72, 73, 228.1, 228.3, 231.41, 248/229.12, 229.22, 230.3, 70; 385/134–137
See application file for complete search history.

(56) References Cited

U.S. PATENT DOCUMENTS

| | | | |
|---|---|---|---|
| 5,100,221 A | 3/1992 | Carney et al. | |
| 5,142,606 A | 8/1992 | Carney et al. | |
| 5,316,243 A | 5/1994 | Henneberger | |
| 5,752,781 A | 5/1998 | Haataja et al. | |
| 5,937,131 A | 8/1999 | Haataja et al. | |
| 5,971,509 A | 10/1999 | Deimen et al. | |
| 6,282,360 B1 | 8/2001 | Milanowski et al. | |
| 6,516,498 B2 * | 2/2003 | LaCoy | F16L 3/1025 24/16 R |
| 6,633,718 B1 * | 10/2003 | Thom | G02B 6/4459 385/136 |
| 8,141,826 B1 * | 3/2012 | Gallardo | F16L 3/1091 24/16 R |
| 2003/0051892 A1 * | 3/2003 | Mattei | H02G 3/045 174/505 |
| 2003/0183732 A1 | 10/2003 | Nault et al. | |
| 2003/0194195 A1 * | 10/2003 | Thom | G02B 6/4459 385/136 |
| 2003/0218111 A1 * | 11/2003 | Labeirie | B64C 1/406 248/228.1 |
| 2004/0124321 A1 | 7/2004 | Kampf et al. | |
| 2005/0205723 A1 * | 9/2005 | Zeuner | F16L 3/24 248/72 |
| 2011/0074117 A1 | 3/2011 | Caveney et al. | |
| 2012/0037756 A1 * | 2/2012 | Guthke | B64C 1/406 244/131 |
| 2012/0037763 A1 * | 2/2012 | Guthke | H02G 3/263 248/65 |
| 2012/0037765 A1 * | 2/2012 | Guthke | H02G 3/32 248/67.5 |
| 2012/0294581 A1 | 11/2012 | Takisaki et al. | |

FOREIGN PATENT DOCUMENTS

| | | | | |
|---|---|---|---|---|
| DE | 10016225 | * | 3/2000 | ............... F16L 3/24 |
| WO | WO0218991 | | 3/2002 | |

OTHER PUBLICATIONS

U.S. Appl. No. 11/483,783 "Fiber Transition Trough Coupling System" filed May 1, 2003; 33 pages.

(Continued)

*Primary Examiner* — Christopher Garft
(74) *Attorney, Agent, or Firm* — Lee & Hayes, PLLC (57) ABSTRACT

A telecommunications infrastructure includes first and second trough members for routing signal-carrying fibers. Latching members may be used to adjustably couple coupling members adjustably coupled with a trough members. Support members may also be used to adjustably couple trough members together with coupling members.

14 Claims, 7 Drawing Sheets

(56) References Cited

OTHER PUBLICATIONS

Non-Final Office Action for U.S. Appl. No. 13/110,679, mailed on Mar. 26, 2013, Walter Dean Takisaki et al., "Adjustable Trough-Couplers", 14 pages.

The PCT Search Report mailed Nov. 28, 2012 for PCT application No. PCT/US12/35994, 9 pages.

The PCT Search Report and Written Opinion mailed Mar. 4, 2015 for PCT application No. PCT/US2014/25967, 10 pages.

* cited by examiner

ADJUSTABLE TROUGH-COUPLERS

BACKGROUND

Optical fibers can be used to transmit large volumes of data and voice signals over relatively long distances, with little or no signal degradation. For this reason, optical fibers have become widely used in the telecommunication field. As the use of optical fibers has increased, new systems have been developed for managing and organizing larger numbers of optical fibers.

In a typical telecommunications facility, a trough system is used to route the fiber optic cables. Generally, the trough system is located overhead and over the location of the fiber optic racks, cabinets, and other equipment. The trough system in even a small telecommunications facility can be substantial, requiring significant time and expense to install. Some systems require tools for installation of the trough system, adding to the assembly time and expense. Even systems that do not require tools for installation of the system may require substantial planning to design the trough coupling system for a particular installation.

SUMMARY

Trough systems, components, and methods of using and installing such systems and components are disclosed, which can be assembled and disassembled quickly and easily, without any tools. In one aspect, a tool-less telecommunications trough system infrastructure includes a latching member to adjustably couple and bridge a portion of a gap separating a first trough and a second trough. A latching member may be used to adjustably couple to a coupling member coupled to one of the first or second trough, for routing signal-carrying fibers across the gap and to and/or from the first and second trough members. The latching member includes first and second channels to removeably receive a portion of the coupling member. The second channel of the latching member may removeably receive a portion of another coupling member, or a portion of an extension member, and used to bridge the gap disposed between the first and second trough members. The latching member includes a latch mechanism arranged on at least one of first and/or second passageway walls and used to adjustably couple with first and/or second cooperating latch mechanisms arranged on first and/or second passageway walls of a coupling member or first and/or second passageway walls of an extension member.

In another aspect, a tool-less telecommunications trough system infrastructure includes a support member to adjustably couple with first and second passageway walls of a trough. The support member includes a first structural member arranged to adjustably couple with a second structural member. In one aspect, the first structural member includes a rail member having a latching mechanism arranged to adjustably couple with a cooperating latching mechanism of the second structural member. The first structural member may adjustably couple with any one of a plurality of second structural members, each second structural member having a different length, to provide for adjustably coupling the support member with any one of a plurality of different sized troughs.

In another aspect, a method of installing a tool-less telecommunications trough system infrastructure includes coupling a support member to a trough. The method includes displacing the second structural member relative to the first structural member, such that the trough is squeezed in-between the first and second structural members of the support member. In one aspect, the method may include displacing the cooperating rail member of the second structural member substantially linearly, relative to the rail member of the first structural member. In another aspect, the method may include coupling the support member to a coupling member adjustably coupled with a trough.

BRIEF DESCRIPTION OF THE DRAWINGS

The detailed description refers to the accompanying figures. In the figures, the left-most digit(s) of a reference number identifies the figure in which the reference number first appears. The use of the same reference numbers in different figures indicates similar or identical items.

DETAILED DESCRIPTION

This application describes implementations including tool-less adjustable trough-coupling systems and components thereof, such as adjustable latching members and adjustable support members for adjustably coupling multiple trough members together. The tool-less adjustable trough-coupling systems can be assembled and disassembled without impacting existing trough systems. This helps to minimize the time and expense of installing trough systems and/or reconfiguring or disassembling the trough systems after installation.

The implementations are described in the context of an overhead trough system for managing optical fibers in a telecommunications facility. However, the implementations described herein may be used in other environments and are applicable to other contexts. For example, the tool-less trough systems may be located at any desired location, including overhead, below the floor, or at any location in between. In addition, the apparatuses may be used to manage fibers other than optical fibers, such as wires, Ethernet cables, coaxial cables, and/or other signal carrying fibers, and may be used in any environment in which such fibers are used.

Exemplary Adjustable Trough-Coupling System(s)

Figure 1:
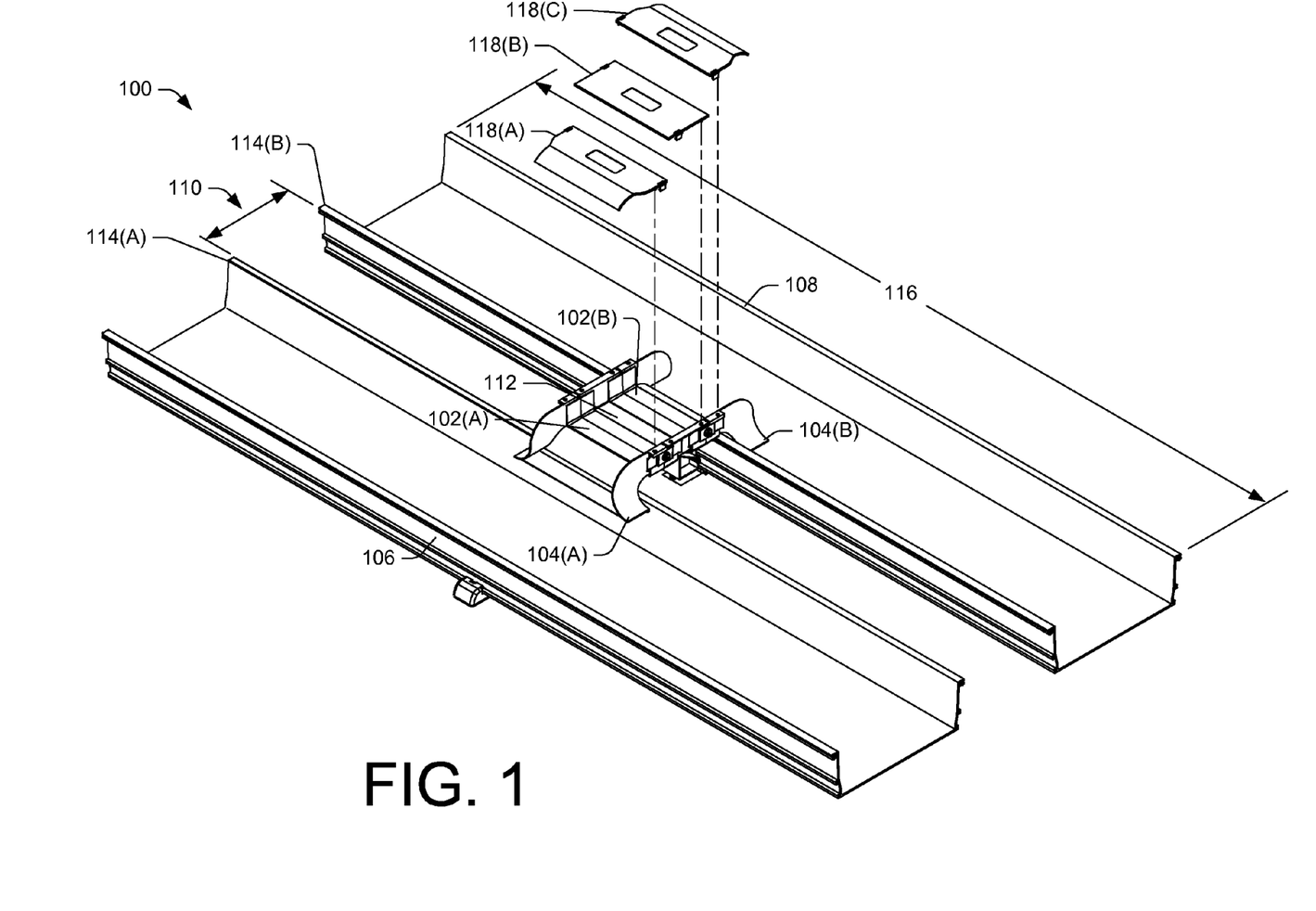
FIG. 1 is a perspective view showing a latching member adjustably coupled with a coupling member adjustably coupled with a first trough and bridging a portion of a gap separating the first trough from a second trough arranged alongside the first trough in an exemplary tool-less trough-coupling system.

FIG. 1 illustrates a portion of an exemplary trough system 100 comprising latching members 102(A) and 102(B) adjustably coupled with coupling members 104(A) and 104(B). The coupling members 104(A) and 104(B) being adjustably coupled with a first trough member 106 and a second trough member 108, and bridging a portion of a gap 110 separating the first trough member 106 from the second trough member 108 arranged alongside the first trough member 106. The latching members 102(A) and 102(B) adjustably coupled with the coupling members 104(A) and 104(B) bridging another portion of the gap 110. An extension member 112 may adjustably couple the latching member 102(A) coupled with the first coupling member 104(A) with the other latching member 102(B) adjustably coupled with the second coupling member 104(B). The extension member 112 is shown bridging a remaining portion of the gap 110 separating the first trough member 106 from the second trough member 108.

FIG. 1 shows that when the extension member 112, the first and second latching members 102(A) and 102(B), and the first and second coupling members 104(A) and 104(B), are substantially perpendicular to the first and second trough members 106 and 108, the trough system 100 may form a part of a telecommunications infrastructure for managing and routing optical fibers. While FIG. 1 illustrates the trough system 100 having two latching members 102(A) and 102(B), it should be understood that one latching member 102(A) or 102(B) may be used. For example, the tough system 100 may have a single latching member (e.g., latching member 102(A)) adjustably coupled with both of the coupling members 104(A) and 104(B). When the single latching member (e.g., latching member 102(A)), and the first and second coupling members 104(A) and 104(B), are substantially perpendicular to the first and second trough members 106 and 108, the trough system 100 may form a part of a telecommunications infrastructure for managing and routing optical fibers.

While the latching members 102(A) and 102(B) are shown to adjustably couple two trough members, it should be understood that any number latching members may be used and configured to adjustably join any number of two or more trough members together and/or to join the trough members at different orientations relative to one another. A typical trough system might include a plurality of trough members of the same or different shapes, coupled together by a plurality of couplers of the same or different shapes and configurations. Trough systems may also include components for connecting the trough system to one or more other fiber management structures, such as racks, cabinets, chassis, and the like.

Generally, each of the coupling members 104(A) and 104(B) rest on a top of a ridge 114(A) and 114(B) (ridges 114 collectively) of the first and second trough members 106 and 108 for adjusting along a length 116 of the first and second trough members 106 and 108. While the coupling members may be illustrated as resting on top ridges of the trough members, the coupling members may be self supporting and arranged just above the trough systems. For example, the coupling members may be adjustably coupled with the trough members via a support member. The ridges 114 of the first and second trough members 106 and 108 may be substantially in the same plane. While the ridges 114 of the first and second trough members 106 and 108 may be shown to be substantially in the same plane, the ridges 114 of the first and second trough members 106 and 108 may be in different planes. For example, the ridges of the first trough member may be above or below the ridges of the second trough member.

While the first trough member 106 and the second trough member 108 are shown to be separated by the gap 110, it should be understood that the first and second trough members 106 and 108 may be separated by any sized gap that the latching member(s) 102(A) and/or 102(B) and/or extension member 112 may be used and configured to bridge. For example, a typical trough system might include a plurality of trough members of the same or different shapes, separated by a plurality of different sized gaps. As such, one or two of the latching member(s) 102(A) and 102(B) may be used to span respective sized gaps. Moreover, a plurality of different sized extension members 112 may configured to span respective sized gaps and used in conjunction with the latching member(s) 102(A) and 102(B) to span respective sized gaps. For example, an installer may need to span any sized gap (e.g., 3 inch (7.62 centimeters), 4 inch (10.16 centimeters), 6 inch (15.24 centimeters), 8 inch (20.32 centimeters), 12 inch (30.48 centimeters), or 24 inch (60.96 centimeters) gap) between first and second trough members 106 and 108. For example, the extension member 112 bridging the remaining portion of the gap 110 separating the first trough 106 from the second trough member 108 may comprises a length of up to about 24 inches (60.96 centimeters).

In some installations, trough systems may comprise multiple trough members that are all disposed within the same level plane. For example the first trough member 106 may be in the same plane as the second trough member 108. Further, an installer may install multiple coupling members 104(A) and 104(B), along with respective latching members 102(A) and 102(B) and/or extension members 112, to bridge any number of gaps between multiple trough members. For example, an installer may bridge a first gap (e.g., a 4 inch (10.16 centimeters) gap) by installing the coupling members 104(A) and 104(B) on each trough member (e.g., first trough member 106 and second trough member 108) separated by the first gap (i.e., the 4 inch (10.16 centimeters) gap) and installing a single latching member (e.g., latching member 102(A)) to bridge the remaining portion of the first gap (i.e., the 4 inch (10.16 centimeters) gap). The installer may also bridge a second gap (e.g., a 24 inch (60.96 centimeters) gap) by installing the coupling members 104(A) and 104(B) on each trough member (e.g., first trough member 106 and second trough member 108) separated by the second gap (i.e., the 24 inch (60.96 centimeters) gap) and installing both of the latching members 102(A) and 102(B) and the extension member 112 to bridge the remaining portion of the second gap (i.e., the 24 inch (60.96 centimeters) gap).

Further, the coupling members 104(A) and 104(B) may be selectively positioned at any location along the length 116 for managing and routing optical fibers at the selected position. For example, an installer may selectively position the coupling members 104(A) and 104(B) at a desired location to route optical fibers from the first trough member 106 to the second trough member 108 without compromising the first and second trough members. For example, an installer is able to route fiber cables from the first trough member 106 to the second trough member 108 without cutting into either the first or the second trough members 106 or 108.

FIG. 1 illustrates the trough system 100 may include covers 118(A), 118(B), and/or 118(C). Covers 118(A)-118(C) may couple with the latching members 102(A) and 102(B). For example, the covers 118(A)-118(C) may comprise a fastening mechanism (e.g., a snap-fit, a press-fit, an interference-fit, a fastener, a quick-release mechanism, etc.) arranged to couple with a cooperating fastening mechanism of the latching members 102(A) and 102(B). The covers 118(A)-118(C) may protect and/or manage optical fibers organized in the latching members 102(A) and 102(B) and/or the coupling members 104(A) and 104(B).

Figure 2:
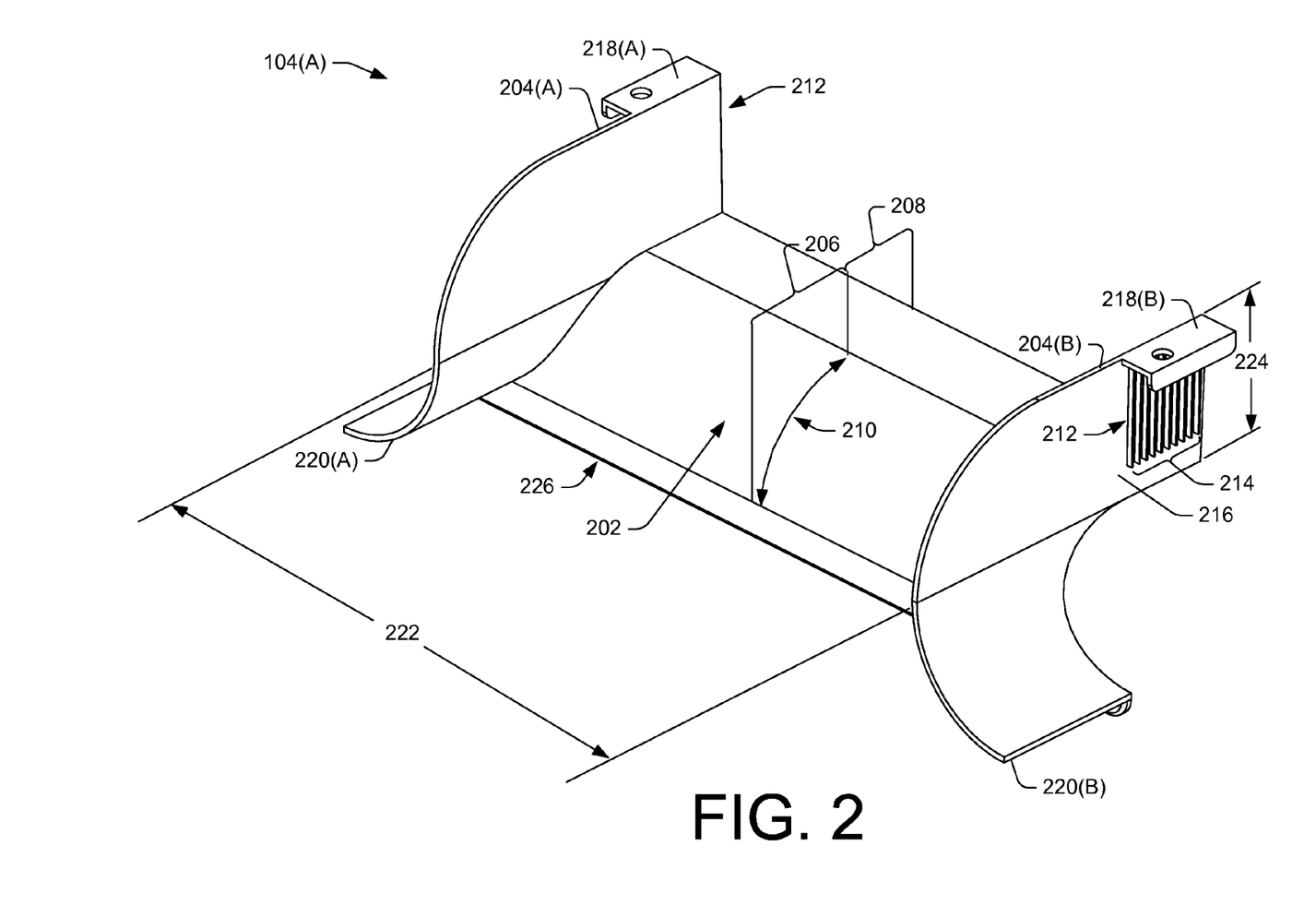
FIG. 2 is an isometric view showing the coupling member of FIG. 1 in more detail.

FIG. 2 is an isometric view showing the coupling member 104(A) of FIG. 1 in more detail. The coupling member 104(A) includes a passageway base 202 disposed between first and second passageway walls 204(A) and 204(B) defining a fiber passageway. The passageway base 202 having a convex passageway side 206 and a planar passageway side 208 extending distal to the convex passageway side 206. FIG. 2 shows the convex passageway side 206 comprises a convex surface profile 210 having a bend radius of at least about 1 inch (2.54 centimeters). The convex surface profile 210 provides for a minimum bend radius to protect the fiber optic cables. While FIG. 2 illustrates a convex surface profile 210 having a bend radius of at least about 1 inch (2.54 centimeters), any convex surface profile suitable for managing a minimum bend radius to protect the fiber optic cables that may be placed and/or routed in a trough system 100 may be utilized. One example minimum bend radius is 1.5 inches (3.81 centimeters), while another example minimum bend radius is 1.18 inches (3 centimeters).

FIG. 2 further illustrates a latching mechanism 212 arranged on the second passageway wall 204(B), opposite the fiber passageway of the coupling member 104(A). While FIG. 2 illustrates the latching mechanism 212 comprising an array of substantially perpendicular protrusions 214 extending distal to a planar surface 216 of the passageway wall 204(B), the latching mechanism 212 may comprise indentations. For example, the latching mechanism 212 may comprise an array of notches extending from the planar surface of the passageway wall 204(B) and in to the wall 204(B). The coupling member 104(A) may include another latching mechanism 212 arranged on the first passage way wall 204(A) opposite the fiber passageway of the coupling member. The latching mechanism 212 may provide for adjustably coupling the coupling member 104(A) together with the latching member 102(A) (discussed in detail below with respect to FIG. 4.

As shown in this figure, the first and second passageway walls 204(A) and 204(B) may comprise a tab 218(A) and 218(B) extending distal to the planar surface of the passageway walls 204(A) and 204(B). The tabs 218(A) and 218(B) may couple with the cover 118(A).

The coupling members 104(A) and 104(B) may have first and second transition tabs 220(A) and 220(B) having convex surfaces protruding distal from first and second ends of the convex passageway side 206, for example, as described in U.S. patent Ser. No. 13/110,679, titled "Adjustable Trough-Couplers," the contents of which are incorporated by reference herein in its entirety.

As FIG. 2 illustrates, the coupling member 104(A) is shown having a width 222. Width 222 may comprise any distance suitable for placing and/or routing fiber optic cables. For example, width 222 may be approximately 4 inches (10.16 centimeters), 6 inches (15.24 centimeters), 12 inches (30.48 centimeters), 24 inches (60.96 centimeters) in width. In other examples smaller or larger widths could be used. Further, a width 222 may be specific to a width of a trough (e.g., first trough member 106 or second trough member 108). For example, a width of the coupling members 104(A) and 104(B) may be chosen based on a size of at least one of the trough members (e.g., first trough member 106 or second trough member 108) the coupling members 104(A) and 104 (B) will couple together. For example, an installer may choose coupling members 104(A) and 104(B) having a width 222 greater than about 24 inches (60.96 centimeters) to adjustably couple a first trough having a width of 24 inches (60.96 centimeters) to a second trough having a width of 24 inches (60.96 centimeters). As another alternative, a width 222 may be specific to an amount of fiber optic cables that may be placed and/or routed in the trough system 100. For example, an installer may only need to place and/or route a single fiber optic cable to or from trough members (e.g., first trough member 106 and second trough member 108). In this example, an installer may choose coupling members 104(A) and 104(B) having a width 222 of about 4 inches (10.16 centimeters) to adjustably couple a first trough having a width of 12 inches (30.48 centimeters) to a second trough having a width of 4 inches (10.16 centimeters). Generally, the width 222 should be sufficient in size for managing a determined quantity of fiber optic cables to be placed and/or routed in a trough system 100 while minimizing a height 224 of the coupling members 104(A) and 104(B).

The coupling members 104(A) and 104(B) may have a lip 226 formed along an end of the convex passageway side 206, for example, as described in U.S. patent Ser. No. 13/110,679, titled "Adjustable Trough-Couplers," the contents of which are incorporated by reference herein in its entirety.

Figure 3:
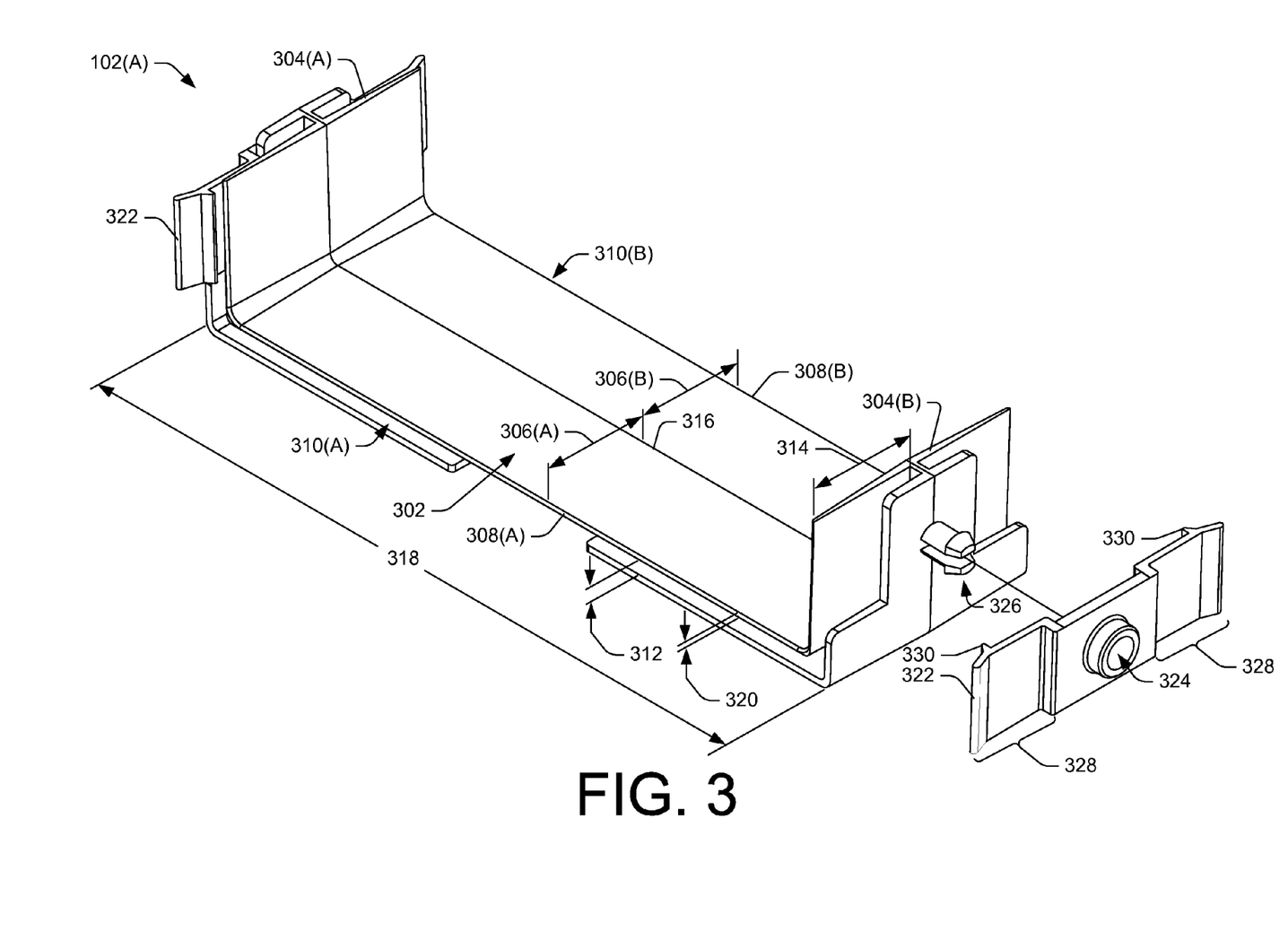
FIG. 3 is an isometric view showing the latching member of FIG. 1 in more detail.

FIG. 3 is an isometric view showing the latching member 102(A) of FIG. 1 in more detail. The latching member 102(A) includes a passageway base 302 disposed between first and second passageway walls 304(A) and 304(B) defining a fiber passageway. The passageway base 302 having a first passageway side 306 extending distal to a second passageway side 308. FIG. 3 illustrates the first and second passageway sides 306(A) and 306(B) having substantially planar surfaces. The latching member 102(A) includes a first edge 308(A) and a second edge 308(B). The first edge 308(A) is arranged along the passageway base 302 and the first and second passageway walls 304(A) and 304(B) on the first passageway side 306(A). The second edge 308(B) is arranged along the passageway base 302 and the first and second passageway walls 304(A) and 304(B) on the second passageway side 306(B).

As illustrated in FIG. 3, the latching member 102(A) includes a first channel 310(A) opposite a second channel 310(B). The first channel 310(A) is arranged along at least a portion of the first edge 308(A), and the second channel 310(B) is arranged along at least a portion of the second edge 308(B). While FIG. 3 illustrates the first and second channels 310(A) and 310(B) arranged along the first and second edges 308(A) and 308(B) of the passageway base 302 and the first and second passageway walls 304(A) and 304(B), the channels 310(A) and/or 310(B) may be arranged along a portion of the first and second edges 308(A) and 308(B) of the passageway base 302 and the first and second passageway walls 304(A) and 304(B). For example, the channel 310(A) may be arranged along the first edge 308(A) of the passageway base 302, but not along the first edge 308(A) of the passageway walls 304(A) and 304(B). In another example, the channel 310(A) may be arranged along the first edge 308(A) of the passageway walls 304(A) and 304(B), but not along the first edge 308(A) of the passageway base 302. In another example, the channel 310(A) may be arranged along a portion of the first edge 308(A) of the passageway base 302 and along a portion of the first edge 308(A) of the passageway walls 304(A) and 304(B).

FIG. 3 illustrates the first and second channels 310(A) and 310(B) have a gap 312 extending distal to the fiber passageway. FIG. 3 illustrates the gap 312 extending a distance from a bottom portion of the edge 308(A) distal to the passageway base 302 and the passageway walls 304(A) and 304(B). The gap 312 may comprise any distance suitable for receiving at least a portion of the planar passageway side 208 of the coupling members 104(A) or 104(B). For example, the distance of the gap 312 may be approximately 0.01 inches (0.3 centimeters). FIG. 3 also illustrates the first and second channels 310(A) and 310(B) have a depth 314 extending in towards a middle 316 of the latching member 102(A). For example, the depth 314 of the gap 312 may extend from the edges 308(A) and 308(B) in towards the middle 316 of the latching member 102(A). The gap 312 may comprise any depth 314 suitable for receiving at least a portion of the planar passageway side 208 of the coupling members 104(A) or 104(B). For example, the depth 314 of the gap 312 may be approximately 1.6 inches (4 centimeters).

As FIG. 3 illustrates, the latching member 102(A) is shown having a width 318. Width 318 may comprise any distance suitable for placing and/or routing fiber optic cables. For example, width 318 may be approximately 4 inches (10.16 centimeters), 6 inches (15.24 centimeters), 12 inches (30.48 centimeters), 24 inches (60.96 centimeters) in width. In other examples smaller or larger widths could be used. Further, a width 318 may be specific to a width of a coupling member (e.g., first or second coupling member(s) 104(A) or 104(B)). For example, a width of the latching members 102(A) and 102(B) may be chosen based on a size of the coupling members 104(A) and 104(B) the latching members 102(A) and 102(B) will couple together. For example, an installer may choose latching members 102(A) and 102(B) having a width 222 greater than about 24 inches (60.96 centimeters) to adjustably couple a first coupling member 104(A) having a width of 24 inches (60.96 centimeters) to a second coupling member 104(B) having a width of 24 inches (60.96 centimeters).

As illustrated, the edge 308 of the latching member 102(A) has a thin height 320, which provides for the latching member 102(A) to removeably receive the planar passageway side 208 of the coupling member 104(A) without a sharp or harsh edge and well adjacent to the planar passageway side 208. As a result, the edge 308 does not interfere, obstruct, catch, grab, hook, etc., the optical fibers arranged in the fiber passageway. For example, the thin height 320 may be approximately 0.03 inches (0.07 centimeters). Moreover, the substantially planar surfaces of the first and second passageway sides 306(A) and 306(B) may have a substantially sloped cross-sectional profile. For example, the substantially planar surfaces of the first and second passageway sides 306(A) and 306(B) may be sloped from the edge 308 up to the middle 316.

FIG. 3 illustrates the latching member 102(A) including a latch mechanism 322. The latching mechanism 322 is arranged on at least one of the first or second passageway walls 304(A) and/or 304(B) of the latching member 102(A) opposite the fiber passageway. The latching mechanism 322 of the latching member 102(A) adjustably couples with the cooperating latching mechanism 212 of the coupling member 104(A). For example, the latching mechanism 322 may comprise a spring latch, and as discussed above with regard to FIG. 2, the cooperating latching mechanism may comprise an array of indentations or protrusions. The array of indentations or protrusions being arranged to removeably latch with the spring latch.

While FIG. 3 shows the latching mechanism 322 is arranged on the first and second passageway walls 304(A) and 304(B) of the latching member 102(A), via a fastening mechanism (e.g., a snap-fit, a press-fit, an interference-fit, a fastener, a quick-release mechanism, etc.), the latching mechanism 322 may be formed integral with the first and second passageway walls 304(A) and 304(B) of the latching member 102(A). For example, the latching member 102(A) and the latching mechanism 322 may be formed as a single unit of material (e.g., polycarbonate (PC)/acrylonitrile butadiene styrene polymer (ABS) blend). As shown, the latching mechanism 322 includes an aperture 324 arranged to receive a post member 326. For example, aperture 324 of the latching member 322 may be snap-fit, a press-fit, an interference-fit, etc. on to the post member 326 arranged on the second passageway wall 304(B) of the latching member 102(A).

The latching mechanism 322 includes tabs 328 extending distal from the aperture 324. Each of the tabs 328 includes a protrusion 330 extending distal to a planar surface of the tabs 328. The protrusions 330 of the tabs 328 may latch with a respective one of the array of substantially perpendicular protrusions 214 extending distal to the passageway wall 204(B) of the coupling member 104(A). For example, the protrusions 330 may interface with a perpendicular protrusion of the array of perpendicular protrusions 214 such that when the latching member 102(A) receives the coupling member 104(A), the tab 322 is displaced out away from the passageway walls 304(A) and 304(B) to slideably receive the perpendicular protrusion. Subsequent to the latching member 102(A) receiving the coupling member 104(A), the latching mechanism 322 is latched with the cooperating latching mechanism 212 until a user selectively displaces the tabs 322 out away from the passageway walls 304(A) and 304(B) to un-latch the latching mechanism 322 from the cooperating latching mechanism 221. For example, the tabs 322 may be a mechanical spring (e.g., a cantilever spring) arranged to be displaced via a force. The force may be applied to the protrusion 330 from the array of perpendicular protrusions 214 during a coupling of the latching member 102(A) and the coupling member 104(A), or the force may be applied to the tab 330 from a user.

While FIGS. 2 and 3 illustrate the latching mechanism 322 arranged on the first and second passageway walls 304(A) and 304(B) and the cooperating latching mechanism 212 arranged on the first and second passageway walls 204(A) and 204(B), the latching mechanism 322 and cooperating latching mechanism 212 may be arranged below the passageway base 302 and 202 of the latching member 102(A) and the coupling member 104(A), respectively. Moreover, the latching mechanism 322 may be arranged on the coupling member 104(A) and the cooperating latching mechanism 212 may be arranged on the latching member 102(A).

FIG. 3 is a side view of the trough system 100 showing the coupling members 104(A) and 104(B) adjustably coupled to the first and second trough members 106 and 108, the latching members 102(A) and 102(B) adjustably coupled to the first and second trough members 106 and 108, and the extension member 112 adjustably coupled to the latching members 102(A) and 102(B). The first and second trough members 106 and 108 may have one or more ridges 402 extending along all or part of the length of the first and second trough members 106 and 108, for example, as described in U.S. patent Ser. No. 13/110,679, titled "Adjustable Trough-Couplers," the contents of which are incorporated by reference herein in its entirety.

The latching members 102(A) and 102(B) are shown adjustably coupling with the coupling member 104(A) 104(B) adjustably coupled with the first trough member 106 and the second trough member 108. The latching members 102(A) and 102(B) are also shown bridging a portion of the gap 110 separating the first trough member 106 from the second trough member 108. FIG. 3 shows the latching member 102(A) adjustably couples with the coupling member 104(A) adjustably coupled with the first trough member 106 and the other latching member 102(B) adjustably couples with the coupling member 104(B) adjustably coupled with the second trough member 108 via the latch mechanism 322 and the cooperating latching mechanism 212 of the latching members 102(A) and 102(B) and the coupling members 104(A) and 104(B). Similarly, the extension member 112 includes cooperating latching mechanism 212 arranged in the first and second passageway walls and for removeably latching with the latching mechanism 322 of the latching members 102(A) and 102(B).

For example, an installer may adjust and/or selectively position the latching members 102(A) and 102(B) and the extension member 112 in-between the coupling members 104(A) and 104(B) by adjusting (e.g., linearly displacing) the latching mechanisms 322 relative to the cooperating latching mechanisms 212. Further, the latch members 102(A) and 102(B) may provide for relieving a tolerance stack of the trough system 100. For example, the tolerance stack of the trough system may comprise the assembly comprising the coupling members 104(A) and 104(B) adjustably coupled to the first and second trough members 106 and 108, which may effect the size of the gap 110. As such, the latching members 102(A) and 102(B) may provide for relieving the potential size differences in the trough system 100. As discussed above with regard to FIG. 1, the latch members 102(A) and 102(B) may provide for enclosing the fiber passageway via the covers 118(A)-118(C). For example the covers 118(A)-118(C) may removeably latch with the latching members 102(A) and 102 (B) and contain the fiber optic cables routed in the fiber passageway.

Figure 4:
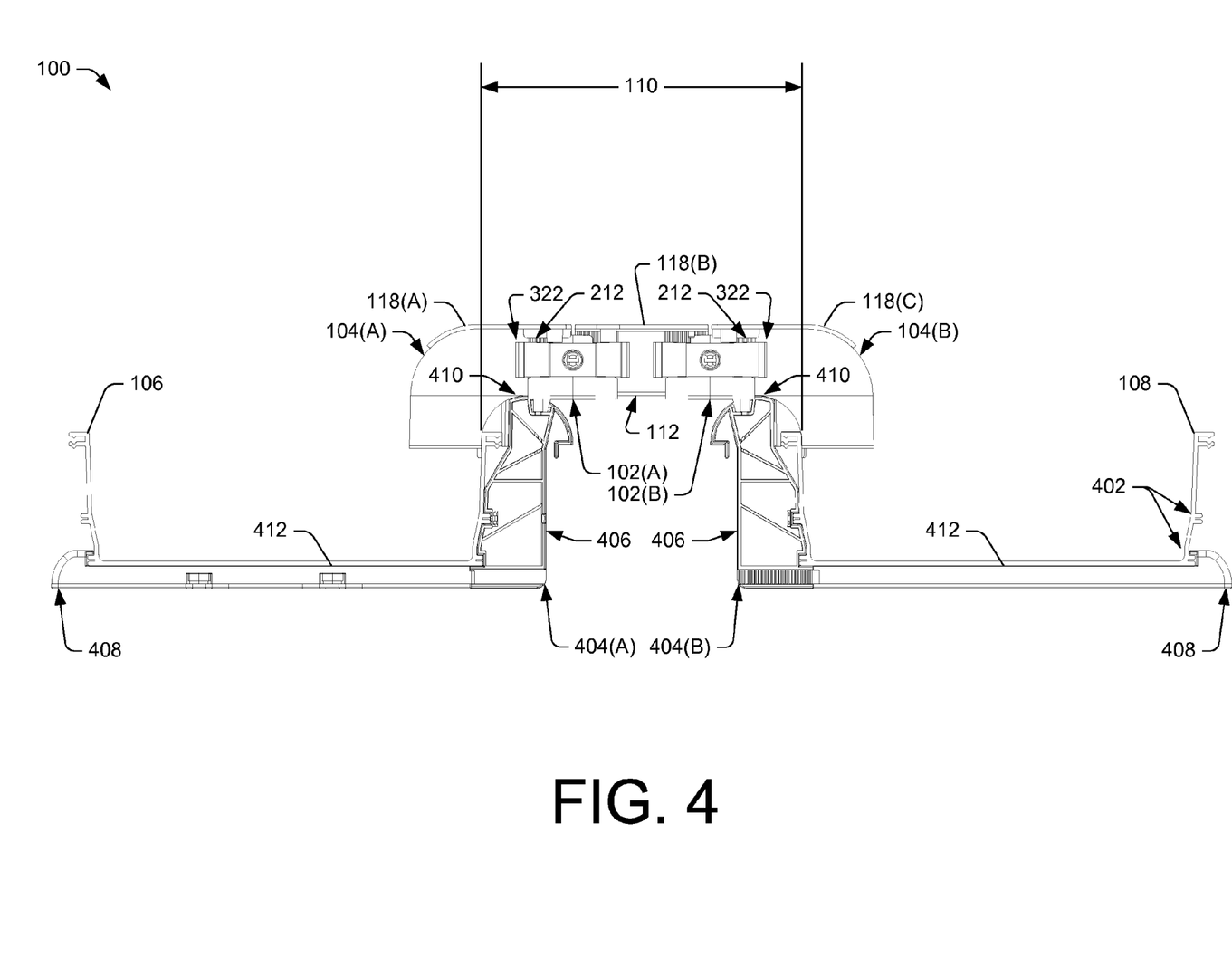
FIG. 4 is a side view showing the latching member adjustably coupled with the coupling members adjustably coupled with the first and second troughs in an exemplary trough-coupling system.

FIG. 4 illustrates support members 404(A) and 404(B) adjustably coupled with first and second trough members 106 and 108. The support members 404(A) and 404(B) include a first structural member 406 adjustably coupled with a second structural member 408. For example, the first and second structural members 406 and 408 may include latching mechanisms arranged to adjustably couple the first and second structural members 406 and 408 together (discussed in detail below with regard to FIGS. 5 and 6).

FIG. 4 shows the first and second troughs 106 and 108 are squeezed in-between the first and second structural members 406 and 408 of each of the support members 404(A) and 404(B). For example, the first structural member 406 of the support member 404(A) is adjustably coupled and in contact with the ridges 402 of a first passageway wall of the first trough 106, and the second structural member 408 of the support member 404(A) is adjustably coupled and in contact with the ridge 402 of the second passageway wall of the first trough 106. FIG. 4 shows the first structural member 406 of the support members 404(A) and 404(B) coupled to an underside 410 of the planar passageway side 208 of the passageway base 202 of the coupling members 104(A) and 104(B). The first structural member 406 of the support members 404(A) and 404(B) may be coupled to an underside 410 of the planar passageway side 208 of the passageway base 202 of the coupling members 104(A) and 104(B), via a fastening mechanism (e.g., a snap-fit, a press-fit, an interference-fit, a fastener, a quick-release mechanism, pins, rivets, or the like). The second structural member 408 of the support members 404(A) and 404(B) may be coupled with a bottom surface 412 of the first and second troughs 106 and 108, via a fastening mechanism (e.g., a snap-fit, a press-fit, an interference-fit, a fastener, a quick-release mechanism, pins, rivets, or the like). FIG. 4 shows the first and second trough members 106 and 108 are substantially within a plane and the latching members 102(A) and 102(B), the coupling members 104(A) and 104 (B), and the extension member 112 are substantially within another plane parallel to the plane of first and second trough members 106 and 108.

Figures 5A, 5B:
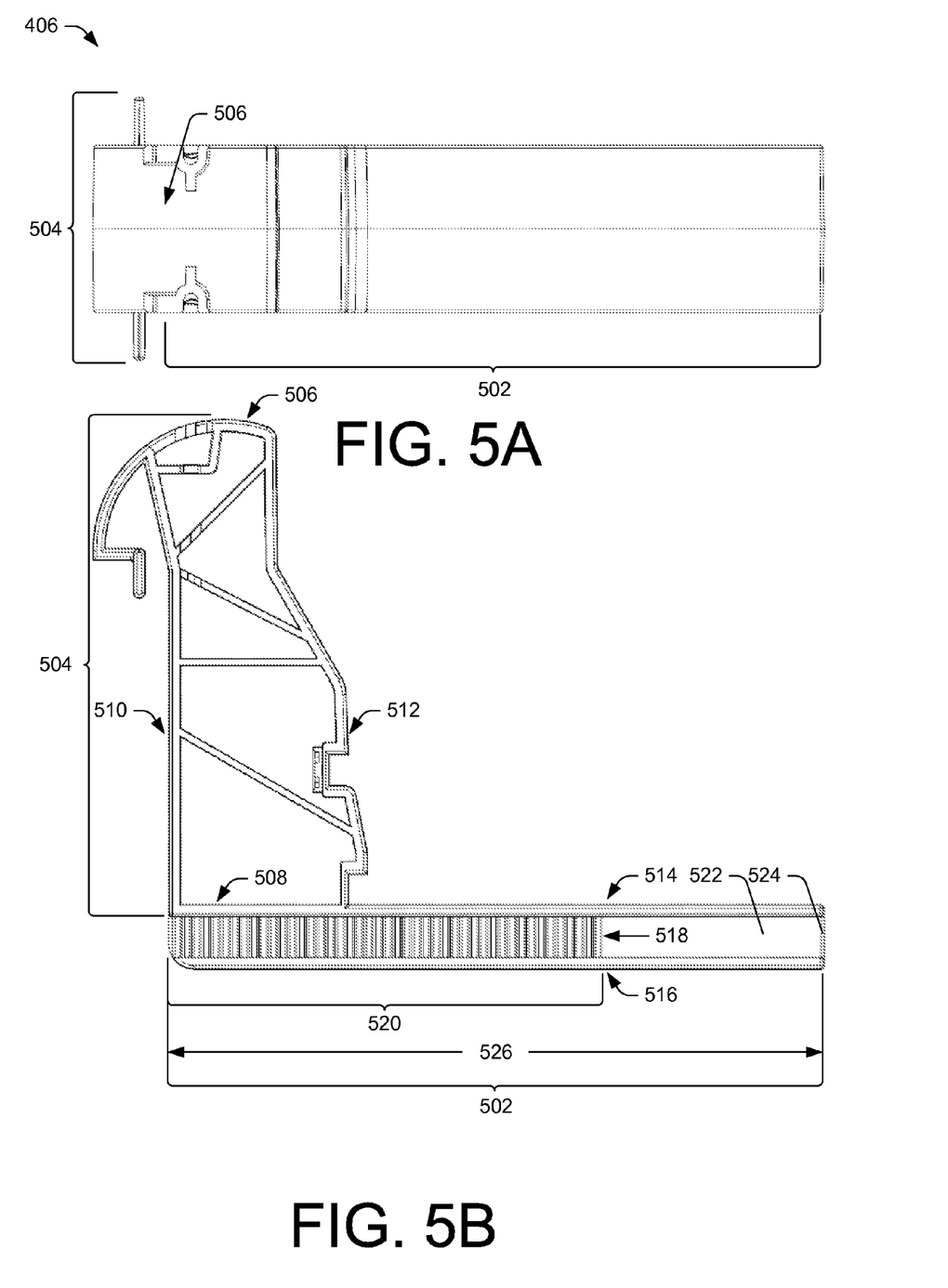
FIG. 5A is a top view showing the first structural member of the support member of FIG. 4.
FIG. 5B is a side view showing the first structural member of the support member of FIG. 4.

FIG. 5A is a top view showing the first structural member 406 of the support members 404(A) and 404(B) of FIG. 4. FIG. 5B is a side view showing the first structural member 406 of the support members 404(A) and 404(B) of FIG. 4. FIGS. 5A and 5B illustrates the first structural member 406 includes a rail member 502 extending substantially perpendicular to a post member 504. While FIGS. 5A and 5B show the post member 504 being formed integral with the rail member 502, the post member 504 and the rail member 502 may be formed as separate units. For example, the post member 504 may be formed as a single unit of material, and the rail member 502 may be formed as a single unit of material, and the post member 504 may be fixed to the rail member 502 via fastener (e.g., pins, threaded fasteners, rivets, press-fit, interference-fit or the like). Moreover, the post member 504 may be fixed to the rail member 502 via an adhesive and/or welding. The post member 504 and the rail member 502 may be formed as a single unit of polycarbonate (PC)/acrylonitrile butadiene styrene polymer (ABS) blend.

The post member 504 includes a top 506 opposite a bottom 508, and a first surface 510 opposite a second surface 512. The first and second surfaces 510 and 512 of the post member 504 arranged between the top and the bottom 506 and 508 of the post member 504. The second surface 512 of the post member 504 adjustably couples with a first passageway wall of a trough. For example, and as discussed above with regard to FIG. 4, the first structural member 406 of the support member 404(A) is adjustably coupled and in contact with the ridges 402 of a first passageway wall of the first trough 106. For example, the second surface 512 of the post member 506 of the first structural member 406 may be adjustably coupled and in contact with the ridges 402 of the first passageway wall of the first trough 106.

Further, the top 506 of the post member 504 couples to the underside 410 of a coupling member 104(A) or 104(B) adjustably coupled with a trough 106 or 108. For example and as discussed above with regard to FIG. 4, the first structural member 406 of the support members 404(A) and 404(B) may be coupled to the underside 410 of the planar passageway side 208 of the passageway base 202 of the coupling members 104(A) and 104(B). For example, the top 506 of the post member 504 may couple to the underside 410 of the planar passageway side 208 of the passageway base 202 of a coupling member 104(A) or 104(B) adjustably coupled with a trough 106 or 108.

FIGS. 5A and 5B illustrate the rail member 502 includes a top surface 514 opposite a bottom surface 516, the top and bottom surfaces 514 and 516 extending substantially perpendicular to the post member 504. FIG. 5B illustrates a latching mechanism 518 arranged between the top and bottom surfaces 514 and 516. While FIGS. 5A and 5B illustrate the rail member 502 having substantially planar top and bottom surfaces 514 and 516, the rail member 502 may have any shaped top and bottom surfaces. For example, the rail member 502 may have substantially curvilinear shaped top and/or bottom surfaces. For example, the rail member 502 may have a substantially cylindrical shaped cross-section. In another example, the rail member 502 may have a substantially planar top surface and substantially curvilinear bottom surface, or vise versa.

The top surface 512 of the rail member 502 may interface and/or support at least a portion of an underside of a trough. For example, and as discussed above with regard to FIG. 4, the first structural member 406 may interface and support at least a portion of the underside of a trough 106 or 108.

FIG. 5B illustrates the latching mechanism 518 arranged between the top and bottom surfaces 514 and 516 may include an array of substantially perpendicular protrusions 520 extending distal to a planar surface 522 of a wall 524 arranged between the substantially planar top and bottom surfaces 514 and 516. The wall may comprise a substantially rectangular cross-sectional shape and have a substantially perpendicular orientation to the substantially planar top and bottom surfaces 514 and 516. Moreover, the substantially rectangular wall 524 may have a thickness of approximately 0.1 inches (0.3 centimeters). While the latching mechanism 518 is shown as an array of substantially perpendicular protrusions 520, the latching mechanism 518 may comprise indentations. For example, the latching mechanism 518 may comprise an array of notches extending from the planar surface 522 of the wall 524 and in to the wall 524. Moreover, the latching mechanism 518 may be arranged on the other planar surface, opposite the planar surface 522, of the wall 524. Further, the rail member 502 may include the latching mechanism 518 on the planar surface 522 of the wall 524 and another similar or different latching mechanism arranged on the other planar surface, opposite the planar surface 522, of the wall 524. The latching mechanism 518 of the rail member 502 may provide for adjustably coupling the first structural member 406 together with the second structural member 408 (discussed in detail below with respect to FIGS. 6A and 6B).

FIG. 5B illustrates the first structural member 406 having a length 526 of approximately 7 inches (18 centimeters). While FIG. 5B illustrates the first structural member 406 having the length 526 of approximately 7 inches, other lengths are contemplated. For example, the length 526 may comprise any length suitable for coupling the mounting members 404(A) and 404(B) to a trough. For example, length 526 may be approximately 4 inches (10.16 centimeters), 6 inches (15.24 centimeters), 12 inches (30.48 centimeters), 24 inches (60.96 centimeters) in length. In other examples smaller or larger lengths could be used. Further, a length 526 may be specific to a width of a trough (e.g., first trough member 106 or second trough member 108). Moreover, the length 525 of the first structural member 406 may be a standard "one-size-fits-all" length, where the second structural member 408 is made available in multiple lengths, such that the mounting members 404(A) and 404(B) fit any sized trough. For example, the length 525 of the first structural member 406 may be a fixed "one-size-fits-all" length of approximately 7 inches, while the second structural member 408 may be manufactured and made available in configuring lengths from at least about 3 inches (7 centimeters) to at most about 24 inches (60 centimeters). In one example, and as discussed below in detail with regard to FIGS. 6A and 6B, the second structural member 408 has a length of at least about 6 inches (18 centimeters) or at most about 12 inches (30 centimeters), such that the mounting members 404(A) and 404(B) may be configured to fit 12 inch, 7 inch, 6 inch, and/or 4 inch sized (i.e., wide) troughs.

The rail member 502 and the post member 504 may have similar widths. For example, the rail member 502 may have a width of about 2 inches (5 centimeters), and the post member 504 may have about a width of 2 inches (5 centimeters). The rail member 502 may have a thickness of about 0.6 inches (1.5 centimeters) and the post member may have a thickness of about 2 inches (5 centimeters) proximate to the bottom 508 and a thickness of about 1 inch (3 centimeters) proximate to the top 506.

Figure 6A:
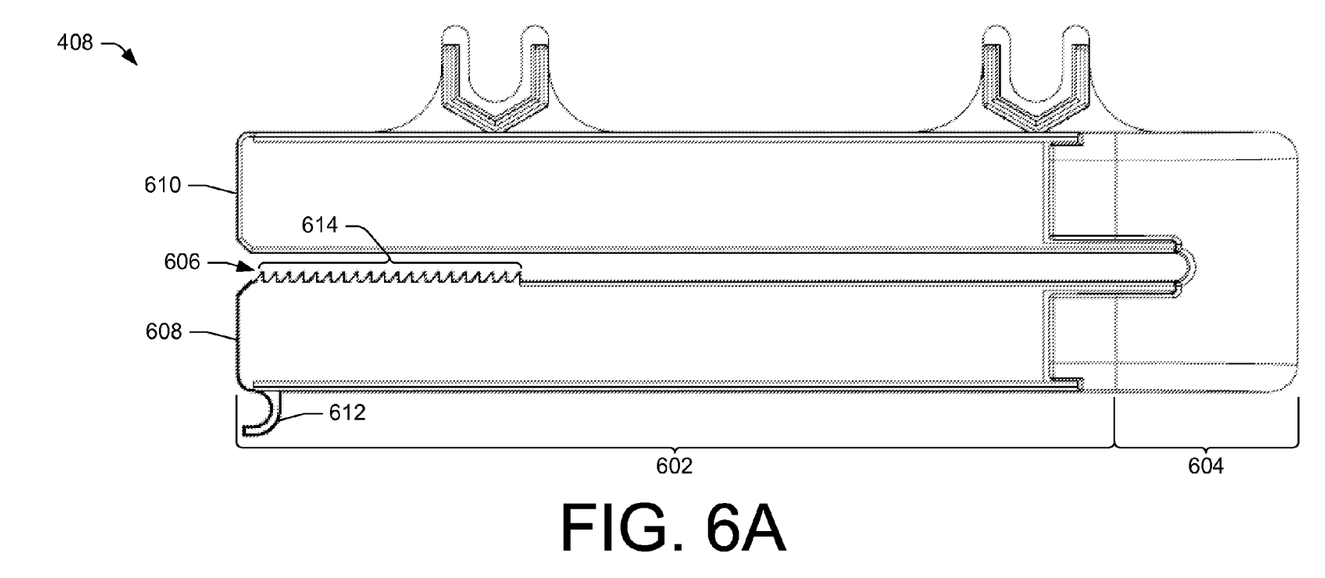
FIG. 6A is a top view showing the second structural member of the support member of FIG. 4.
Figure 6B:
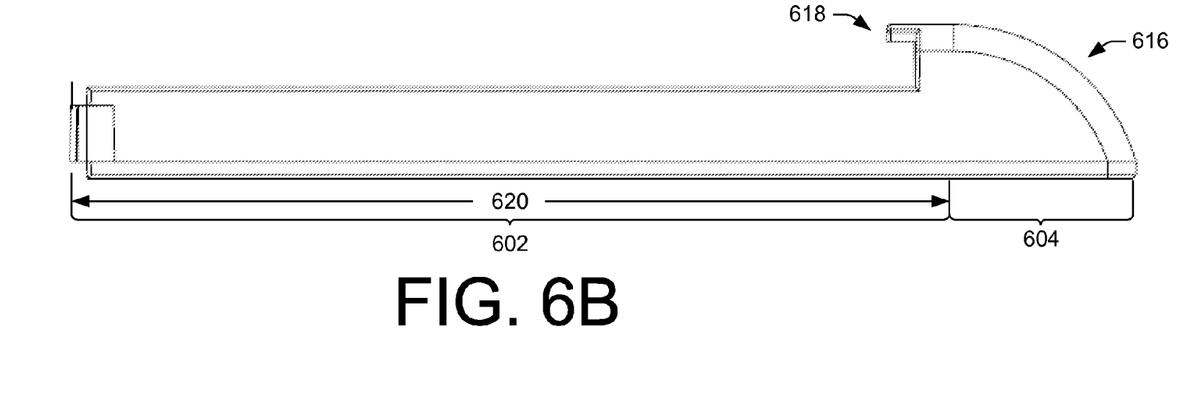
FIG. 6B is a side view showing the second structural member of the support member of FIG. 4.

FIG. 6A is a top view showing the second structural member 408 of the support members 404(A) and 404(B). FIG. 6B is a side view showing the second structural member 408 of the support members 404(A) and 404(B). FIGS. 6A and 6B show the second structural member 408 includes a rail member 602 extending distal to a gripping member 604. The rail member 602 arranged to cooperate with the rail member 502 of the first structural member 406. For example, the cooperating rail member 602 may be adjustably received by the rail member 502. For example, the cooperating rail member 602 may be adjustably received between the top and bottom surfaces 514 and 516 extending substantially perpendicular to the post member 504. The cooperating rail member 602 having a cooperating latching mechanism 606 to adjustably couple with the latching mechanism 518 of the rail member 502.

FIG. 6B illustrates the cooperating rail member 602 extending distal to the gripping member 604 having a first prong member 608 opposite a second prong member 610. The first and second prong members 608 and 610 extending distal to the gripping member 604. FIG. 6B illustrates the first prong member 608 includes the cooperating latching mechanism 606. While FIG. 6B illustrates the first prong member 606 having the cooperating latching mechanism 606, the second prong member 610 may include the cooperating latching mechanism 606. The first prong member 608 of the cooperating rail member 602 adjustably couples with the latching mechanism 518 of the rail member 502. For example, the first prong member 606 may comprise a spring latch, and as discussed above with regards to FIG. 5B, the latching mechanism 518 may comprise an array of indentations or protrusions. The array of indentations or protrusions being arranged to removeably latch with the spring latch. For example, the cooperating latching mechanism 606 may interface with the latching mechanism 518 such that when the rail member 502 receives the cooperating rail member 602, the cooperating latching mechanism 606 is displaced out away from the planar surface 522 of the wall 524 of the rail member 502 to slideably receive the cooperating latching mechanism 606. Subsequent to the rail member 502 receiving the cooperating rail member 602, the latching mechanism 518 is latched with the cooperating latching member 606 until a user selectively displaces the first prong member 608 out away from the wall 524 of the rail member to un-latch the cooperating latching mechanism 606 from the latching mechanism 518. For example, the first prong member 608 may be a mechanical spring (e.g., a cantilever spring) arranged to be displaced via a force. The force may be applied to the cooperating latching mechanism 606 from the latching mechanism 518 during a coupling of the first and second members 406 and 408, or the force may be applied to a tab 612 from a user.

While FIG. 6A illustrates the cooperating latching mechanism 606 having an array of protrusions 614 extending distal to a planar surface of the first prong member 608, the cooperating latching member 606 may include a single protrusion. For example, the cooperating latching mechanism 606 may include a single protrusion to latch with a respective one of the array of substantially perpendicular protrusions 520 extending distal to the wall 524 of the post member 504. The array of protrusions 614 may interface with the array of perpendicular protrusions 520 such that when the rail member 502 receives the cooperating rail member 602, the first prong member 608 is displaced out away from the wall 524 of the post member 504 to slideably receive the array of protrusions 614.

The first and second prongs 608 and 610 may be formed integral with the gripping member 604. For example, the first and second prongs 608 and 610 and the gripping member 604 may be formed as a single unit of material (e.g., polycarbonate (PC)/acrylonitrile butadiene styrene polymer (ABS) blend). The gripping member 604 having a gripping surface 616 opposite a coupling surface 618. The coupling surface 618 being arranged distal to the gripping surface 616. The coupling surface 618 arranged to couple with a second passageway wall opposite the first passageway wall of a trough. For example, and as discussed above with regard to FIG. 4, the first structural member 406 of the support member 404(A) may be adjustably coupled and in contact with the ridges 402 of a first passageway wall of the first trough 106. The coupling surface 618 of the second structural member 408 may be adjustably coupled and in contact with the ridge 402 of the second passageway wall of the first trough 106.

FIG. 6B illustrates the second structural member 408 having a length 620 of approximately 6 inches (15 centimeters). While FIG. 6B illustrates the second structural member 408 having the length 620 of approximately 6 inches, other lengths are contemplated. For example, the length 620 may comprise any length from at least about 6 inches (18 centimeters) to at most about 12 inches (30 centimeters), such that the mounting members 404(A) and 404(B) may be configured to fit 12 inch, 7 inch, 6 inch, and/or 4 inch sized (i.e., wide) troughs. In other examples smaller or larger lengths could be used. Further, a length 620 may be specific to a width of a trough (e.g., first trough member 106 or second trough member 108). The length 620 of the first structural member 406 may be made available in multiple lengths, such that the a user may select and use a second structural member 408 having a length of approximately 8 inches to provide for the mounting members 404(A) and 404(B) to fit at least about a 4 inch wide trough up to at most about a 6 inch wide trough. Further a user may select and use a second structural member 408 having a length of approximately 12 inches to provide for the mounting members 404(A) and 404(B) to fit about a 12 inch trough.

While FIG. 6B illustrates the first and second prongs 608 and 610 having substantially similar shapes (i.e., substantially rectangular cross-sectional shapes), the first and second prongs may have differing shapes. For example, the first prong 608 may have a tapered or slender shape, and the second prong 610 may have a substantially uniform rectangular shape. The first prong 608 may have a tapered or slender shape to provide for the first prong 608 to be a mechanical spring (e.g., a cantilever spring) arranged to be displaced via a force, as discussed above with regard to FIG. 6B. For example, the first prong 608 may have a larger cross-sectional area proximate to the gripping member 604 than a cross-sectional area proximate to the cooperating latching mechanism 606 opposite the gripping member 604. For example, the first prong 608 may have a width of about 0.7 inches (2 centimeters) proximate to the gripping member 604 and a width of about 0.4 inches (1 centimeter) proximate to the cooperating latching mechanism 606 opposite the gripping member 604. The first prong 608 may have a tapered or reduced width from the gripping member 604 to the cooperating latching mechanism 606 opposite the gripping member 604.

The trough-coupling system 100 and the components thereof can be made of any material having the desired combination of strength, cost, weight, electrical conductivity, and other material properties, and can be made by conventional manufacturing and assembling processes. Several suitable materials include, for example, metals, plastics, polymers, composites, and the like.

Example Method of Installing a Tool-Less Telecommunications Trough System

Figure 7:
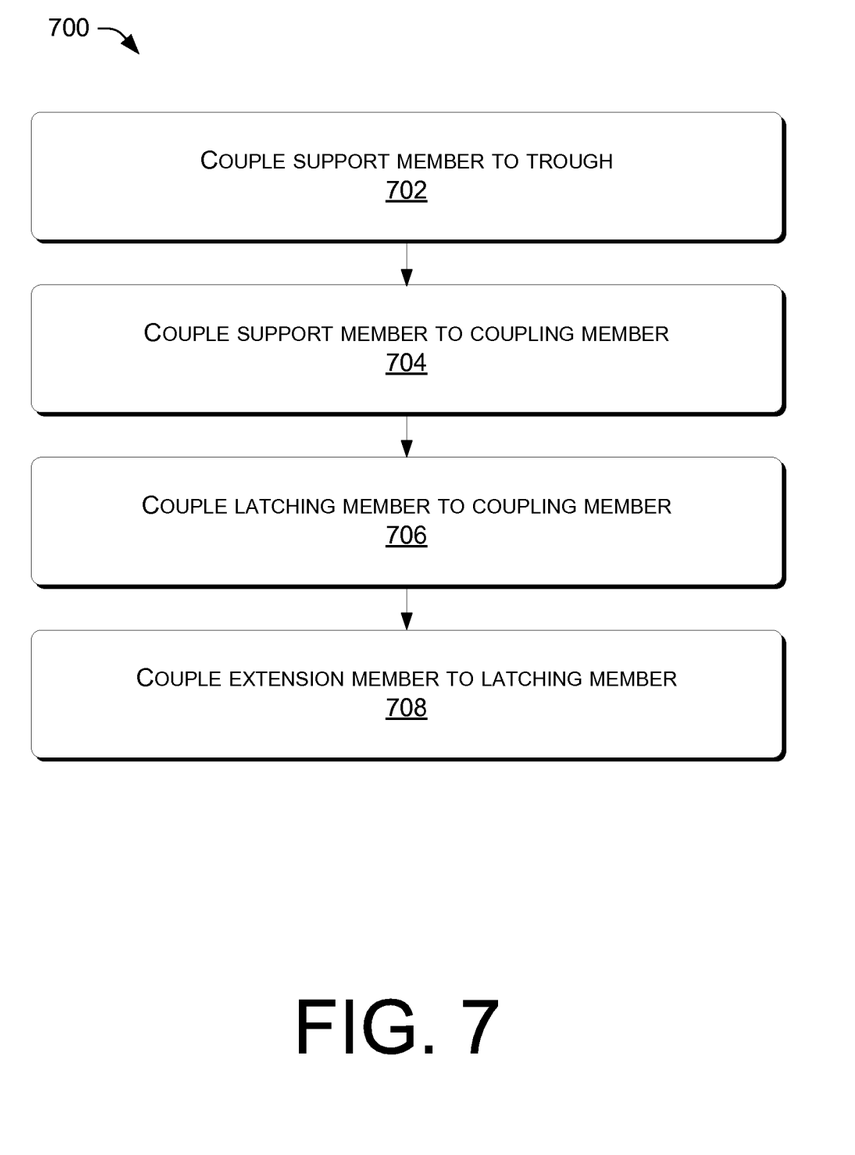
FIG. 7 is a flow diagram that illustrates an example process of installing a tool-less telecommunication trough system at a site.

FIG. 7 is a flow diagram that illustrates an example process 700 of installing a tool-less telecommunications trough system (e.g., tool-less telecommunication trough system 100) at a site. The site may be a telecommunication site. Telecommunication sites may be remote sites, off-grid cell sites (e.g., sites not connected to the public electrical grid), wireless sites, cellular cites, outside plant sites, co-locate sites, central office sites, or any other site of a telecommunication infrastructure or network. This process may be performed to expand or add telecommunications trough systems to the site. In some instances, the site may have an existing telecommunications trough system and the existing telecommunications trough system may be added to with the tool-less telecommunications trough system without the use of tools. In some instances, the site may not have an existing telecommunications trough system and the tool-less telecommunications trough system may be installed in the site. For example, the tool-less telecommunications trough system may provide for routing, re-routing, managing, adding, and/or organizing fibers, such as optical fibers in the facility.

Process 700 may begin with operation 702, which represents coupling a support member (e.g., support member 404(A) or 404(B)) to a trough (e.g., trough 106 or 108). For example, the trough may comprise a passageway base disposed between first and second passageway walls defining a fiber passageway, and the support member may clamp down on to the trough to squeeze the trough. For example, the support member may comprise a first structural member (e.g., first structural member 406) adjustably coupled with a second structural member (e.g., second structural member 408) and the second structural member may be displaced, relative to the first structural member, such that the trough is squeezed in-between the first and second structural members.

Further, the first structural member may include a rail member (e.g., rail member 502) extending substantially perpendicular to a post member (e.g., post member 504), and a latching mechanism (e.g., latching mechanism 518) arranged in the rail member. The second structural member may include a cooperating rail member (e.g., cooperating rail member 602) extending distal to a gripping member (e.g., gripping member 604), and the cooperating rail member includes a cooperating latching mechanism (e.g., cooperating latching mechanism 606).

Moreover, the coupling of the support member to the trough may comprise displacing the cooperating rail member of the second structural member substantially linearly, relative to the rail member of the first structural member, such that the latching mechanism and the cooperating latching mechanism removeably latch together such that the trough is squeezed in-between the post member of the first structural member and the gripping member of the second structural member. For example, the cooperating rail member of the second structural member is displaced substantially linearly, relative to the rail member of the first structural member, such that the post member of the first structural member comes in contact with the first passageway wall of the trough and the gripping member of the second structural member comes in contact with the second passageway wall of the trough.

Process 700 may continue with operation 704, which represents coupling the support member to a coupling member (e.g., coupling member 104(A) or 104(B)). For example, the coupling member may have a passageway base (e.g., passageway base 202) disposed between first and second passageway walls (e.g., first and second passageway walls 204(A) and 204(B)) defining the fiber passageway, the passageway base of the coupling member having a convex passageway side (e.g., convex passageway side 206) adjustably coupled with the trough. Further, the coupling of the support member to the coupling member may comprise coupling the support member to an underside (e.g., underside 410) of the coupling member.

Further, the first structural member of the support member comprises a post member (e.g., post member 504) may have a top (e.g., top 506) opposite a bottom (e.g., bottom 508), and the coupling of the support member to the coupling member comprises coupling the top of the post member to the underside of the coupling member.

Operation 704 may be followed by operation 706, which represents adjustably coupling a latching member (e.g., latching member 102(A) or 102(B)) to the coupling member. For example, the coupling member may include a planar passageway side (e.g., planar passageway side 208) extending distal to the convex passageway side, and at least a portion of the planar passageway side of the coupling member is adjustably coupled with a channel (e.g., channel 310(A) or 310(B)) of the latching member.

Process 700 may be completed at operation 708, which represents adjustably coupling an extension member (e.g., extension member 112) to the latching member. For example, the latching member may include another channel (e.g., second channel 310(B)) opposite the channel, and at least a portion of the extension member is adjustably coupled with the other channel of the latching member.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A tool-less telecommunications support member comprising:
   a first structural member comprising:
      a post member having:
         a top opposite a bottom;
         a first surface opposite a second surface, the first and second surfaces of the post member arranged between the top and the bottom of the post member, wherein:
            the second surface of the post member adjustably couples with a first passageway wall of a trough; and
            the top of the post member couples to an underside of a coupling member adjustably coupled with the trough;
      a substantially I-Beam shaped rail member having:
         a top surface opposite a bottom surface, the top and bottom surfaces extending substantially perpendicular to the post member and form flanges of the rail;
         a wall extending substantially perpendicular to the post member disposed between and substantially perpendicular to the top surface and the bottom surface and forming a web of the rail;
         a latching mechanism arranged on the wall between the top and bottom surfaces, wherein:
            the top surface of the rail member supports at least a portion of an underside of the trough; and
            the latching mechanism of the rail member adjustably couples with a cooperating latching mechanism of a second structural member;
         wherein the top and bottom surfaces and a first side of the wall define a first cavity; and
         wherein the top and bottom surfaces and a second side of the wall define a second cavity.

2. The tool-less telecommunications support member of claim 1, wherein the post member is formed integral with the rail member.

3. The tool-less telecommunications support member of claim 1, wherein the second structural member comprises:
   a cooperating rail member comprising:
      a first prong member disposed at least partially inside the first cavity;
      a second prong member disposed opposite the first prong member and at least partially inside the second cavity;
      a cooperating latching mechanism disposed on one or more of the first prong member and the second prong member proximate a first end of the cooperating rail member, the cooperating latching mechanism adjustably coupled with the latching mechanism of the rail member; and
      a gripping member disposed proximate a second end of the cooperating rail member.

4. The tool-less telecommunications support member of claim 3, wherein the cooperating latching mechanism comprises a spring latch; and
   the latching mechanism comprises an array of indentations or protrusions arranged to removeably latch with the spring latch.

5. The tool-less telecommunications support member of claim 3, wherein the gripping member comprises a gripping surface opposite a coupling surface, the coupling surface of the gripping member arranged distal to the gripping surface and the coupling surface couples with a second passageway wall opposite the first passageway wall of the trough.

6. The tool-less telecommunications support member of claim 1, wherein the trough has a width of at least about 4 inches and up to at most about 6 inches;
   the first structural member has a length of about 7 inches; and
   the second structural member has a length of about 8 inches.

7. The tool-less telecommunications support member of claim 1, wherein the trough has a width of at least about 12 inches;
   the first structural member has a length of about 7 inches; and
   the second structural member has a length of about 12 inches.

8. The tool-less telecommunications support member of claim 1, the latching mechanism comprising a plurality of protrusions disposed on the wall.

9. The tool-less telecommunications support member of claim 3, the cooperating latching mechanism comprising a plurality of protrusions disposed on an inner wall of the first prong, the second prong, or both;
   wherein the wall is disposed between the first prong and the second prong.

10. A tool-less telecommunications support member comprising:
    a first structural member comprising:
       a post member having:
          a top opposite a bottom;
          a first surface opposite a second surface, the first and second surfaces of the post member arranged between the top and the bottom of the post member, wherein:
             the second surface of the post member adjustably couples with a first passageway wall of a trough; and
             the top of the post member couples to an underside of a coupling member adjustably coupled with the trough;

a rail member having:
  a top surface opposite a bottom surface, the top and bottom surfaces extending substantially perpendicular to the post member;
  a wall extending substantially perpendicular to the post member disposed between and substantially perpendicular to the top surface and the bottom surface;
  a latching mechanism arranged on the wall between the top and bottom surfaces, wherein:
    the top surface of the rail member supports at least a portion of an underside of the trough; and
    the latching mechanism of the rail member adjustably couples with a cooperating latching mechanism of a second structural member;
  wherein the top and bottom surfaces and a first side of the wall define a first cavity; and
  wherein the top and bottom surfaces and a second side of the wall define a second cavity.

11. The tool-less telecommunications support member of claim 10, wherein the second structural member comprises:
a cooperating rail member comprising:
  a first prong member disposed at least partially inside the first cavity;
  a second prong member disposed opposite the first prong member and at least partially inside the second cavity;
  a cooperating latching mechanism disposed on one or more of the first prong member and the second prong member proximate a first end of the cooperating rail member, the cooperating latching mechanism adjustably coupled with the latching mechanism of the rail member; and
  a gripping member disposed proximate a second end of the cooperating rail member.

12. The tool-less telecommunications support member of claim 11, wherein the cooperating latching mechanism comprises a spring latch; and
  the latching mechanism comprises an array of indentations or protrusions arranged to removeably latch with the spring latch.

13. The tool-less telecommunications support member of claim 10, the latching mechanism comprising a plurality of protrusions disposed on the wall.

14. The tool-less telecommunications support member of claim 3, the cooperating latching mechanism comprising a plurality of protrusions disposed on an inner wall of the first prong, the second prong, or both;
  wherein the wall is disposed between the first prong and the second prong.

* * * * *